United States Patent [19]

Mager et al.

[11] Patent Number: 4,835,545
[45] Date of Patent: May 30, 1989

[54] MODULATING LASER INTENSITY IN A LASER PRINTER PROPORTIONATELY TO THE VELOCITY OF THE PHOTOCONDUCTIVE MEDIA

[75] Inventors: Donald V. Mager, St. Paul; James A. Howe, Burnsville, both of Minn.

[73] Assignee: Printware, Inc., Mendota Heights, Minn.

[21] Appl. No.: 126,479

[22] Filed: Nov. 30, 1987

[51] Int. Cl.⁴ .......................... G01D 9/00; G01D 9/42
[52] U.S. Cl. ...................................... 346/1.1; 346/108; 346/160; 354/4; 354/5
[58] Field of Search ................. 346/108, 107 R, 76 L, 346/160, 1.1; 354/4, 5

[56] References Cited

U.S. PATENT DOCUMENTS 4,422,083 12/1983 Neumann ............................. 346/108
4,551,732 11/1985 Rogers ................................ 346/108

Primary Examiner—E. A. Goldberg
Assistant Examiner—Mark Reinhart
Attorney, Agent, or Firm—Dressler, Goldsmith

[57] ABSTRACT

A photosensitive, photoconductive media moving in a first direction relative to a laser light beam scanning in a second direction, transverse to the first direction, incurs velocity variations. These velocity variations result in variations in the absolute and relative heights of white and black image features. This printed image nonuniformity is especially visually detectable for closely spaced parallel lines in the second direction, and/or gray scale. An optical velocity sensor senses instantaneous media velocity. An analog or digital velocity error processor maintains a running average velocity and determines, by subtraction, an instantaneous velocity error as the difference between currently sensed and running average velocities. The instantaneous velocity error so determined is used to adjust the intensity of the laser light beam to be proportionally brighter (dimmer), exposing a wider (narrower) scan line, on a faster-moving (slower-moving) media region. By this compensating, the ratio of white and black image features is maintained constant during media velocity variations.

17 Claims, 6 Drawing Sheets

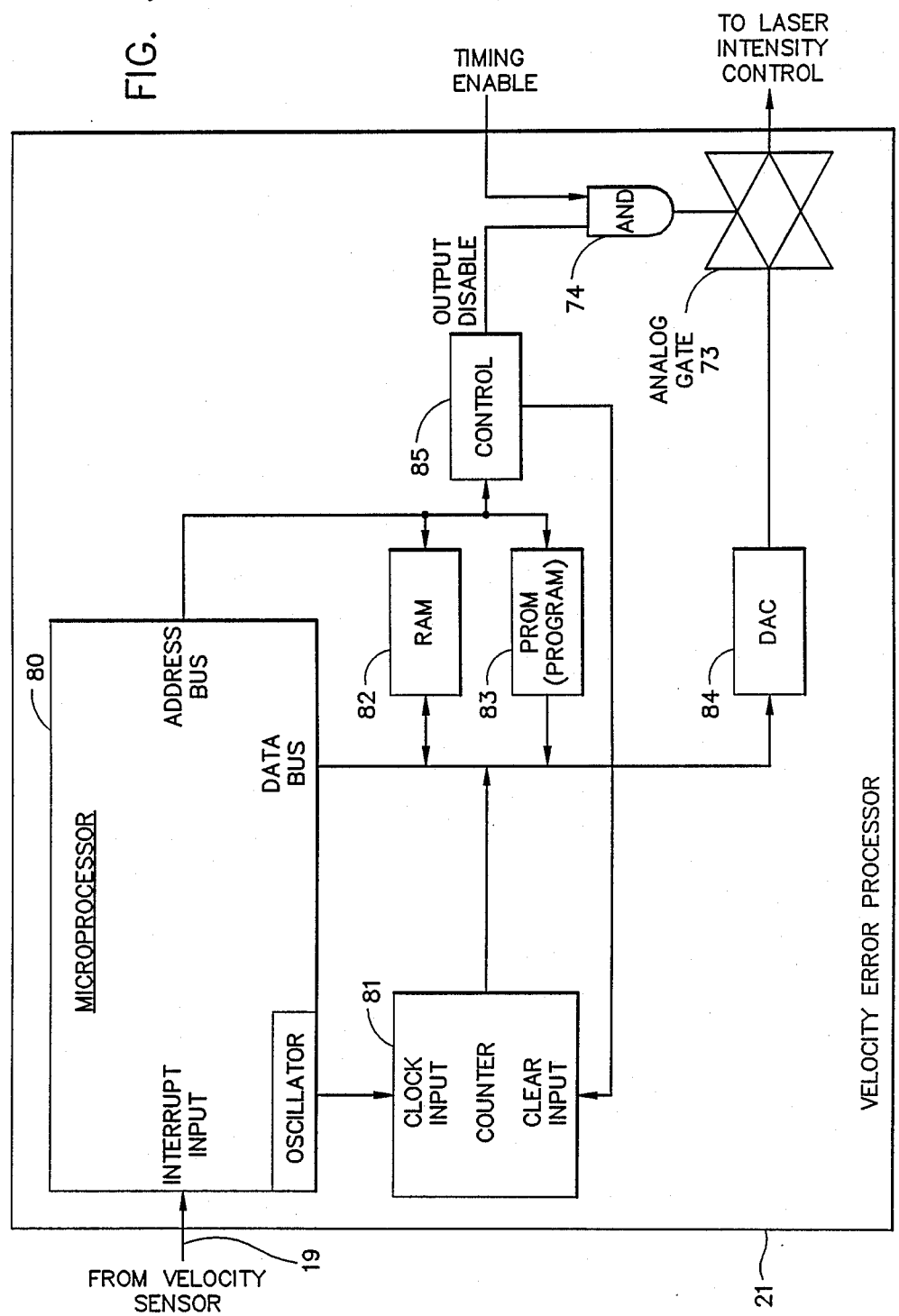

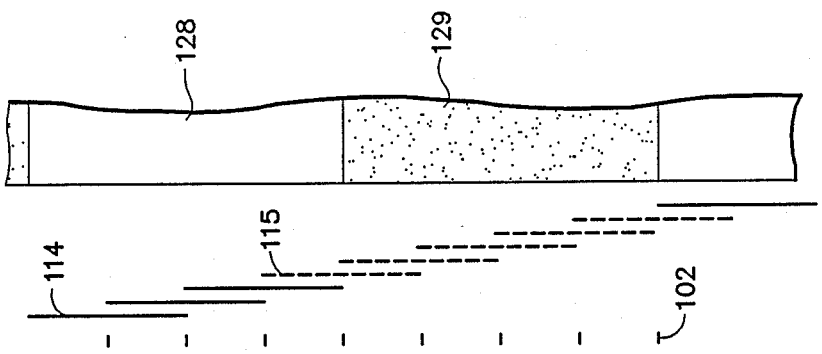
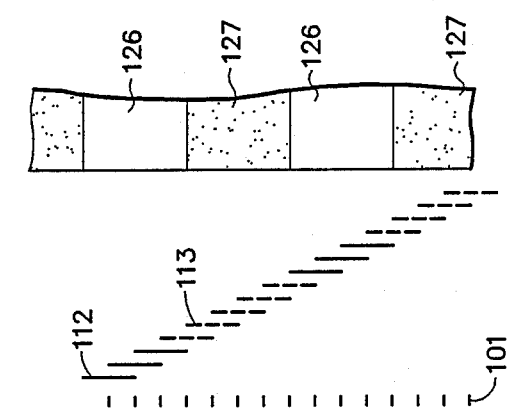
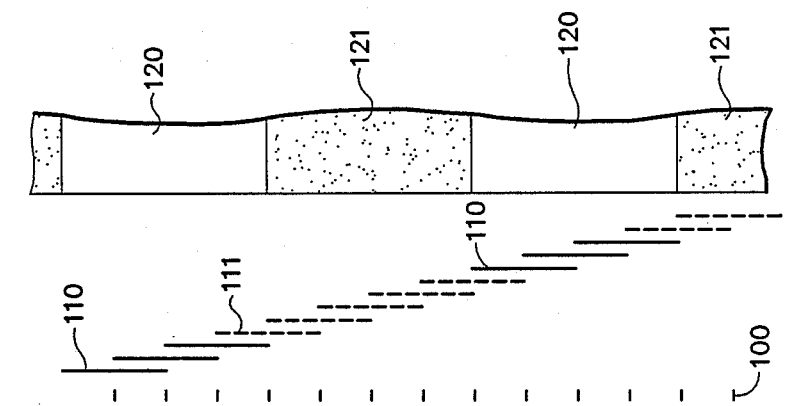

MODULATING LASER INTENSITY IN A LASER PRINTER PROPORTIONATELY TO THE VELOCITY OF THE PHOTOCONDUCTIVE MEDIA

BACKGROUND OF THE INVENTION

1. Field of the Invention

The present invention generally relates to a light, or laser, printer in which a photosensitive or photoconductive media is moved in a first direction relative to a light, or laser, beam which is scanned in a second direction, perpendicular to the first direction, in order to selectively expose, or print, regions of the media. The present invention particularly relates to compensating for variations in the velocity of the first direction movement of the media, which velocity variations cause undesirable variations in the image produced, or printed.

2. Description of the Prior Art

In a light, or laser, printer of either the scanning head or linearly-arrayed Light Emitting Diode (LED) type, an electrically charged, photosensitive (normally a photoconductive) media is moved in front of the light source. The photosensitive media may be, for example, either a photoconductive drum or belt. This photoconductive media is selectively discharged (exposed) in certain areas by the laser beam in order to form an image. In some laser printers the toner is maintained charged at the general electrical potential of the photoconductive media, making that there is initially no attraction nor any pickup of the charged toner by the charged media. Then the photoconductive media is selectively discharged by the laser beam. Toner is thereby attracted and held only to the area of the media that is exposed to the laser beam during an electrostatic printing process, causing the printing of black (or color) in this area.

In other laser printers, the photoconductive meda and the toner are oppositely charged. An area of the media is then selectively discharged (exposed) by the laser beam during the electrostatic printing process, discharging this area to the general electrical potential of the toner. The toner is not attracted to this area of the media, thereby printing black (or color) in all other areas of the media that were not discharged (exposed) by the laser beam. The principles of the present invention are applicable to either type of laser printer. The image that is generated on the photoconductive media is transferred to a final media which may be, for example, either paper or plastic film. Alternatively, the photoconductive media may itself be a final media, such as a specially coated photoconductive paper.

In either the case of directly- or of indirectly-exposed photoconductive media, and for either the case of printing black or printing white from the laser-exposed regions, it is extremely difficult to precisely control the instantaneous velocity of the media, which is slow moving in relation to the high speeds at which it is exposed with a light beam. It is desired that this velocity should be absolutely uniform and invariant in order that the image selectively exposed on the photosensitive and photoconductive media should be correspondingly uniform and invariant. Small instantaneous velocity changes will, however, be irreducibly present in the movement of the media.

These instantaneous variations in the velocity of the moving photosensitive media have many causes. These causes are inherent in the mechanical system causing movement of the media. This mechanical system incorporates bearings, gear teeth, belts and other mechanical elements which may be subject to variation in shape, fit, finish, friction, elasticity, slip, concentricity, alignment, and other factors affecting the precision and uniformity of the mechanical drive. If an electric motor is involved then the poles of such a motor may be non-uniform. There is friction within the mechanical system between the moving and non-moving parts. The media itself may provide an irregular load on the mechanical drive system. The drive system may be subject to slip between its parts, and may be affected by shock or vibration. Finally, the entire mechanical drive system may be subject to effects of wear.

Many of the mechanical causes of slight velocity variations in the movement of the photosensitive, and photoconductive, media may be minimized by the use of precision mechanical components. However, these components (such as anti-backlash gears) significantly raise the cost of the mechanical drive system while not entirely eliminating variations in the velocity of the movement of the media.

The irreducible and inescapable velocity variations occurring in the movement of the photosensitive, and photoconductive, media within a laser printer are adverse to the quality of the printed image. These adverse effects are particularly noticeable when printing very narrow and very closely spaced parallel lines which are perpendicular to the direction in which the media is moving. Lines will appear to vary in thickness and in line-to-line spacing. They will not have the desired appearance of a finely ruled reticular grid. Additionally, the velocity variations will cause visually perceptible imperfections when a laser printer is used to print a grey scale consisting of very small black dots or squares alternating with unprinted dot or square areas. Velocity variations in the movement of the photosensitive media will appear to cause striations, or gradient variations in density, across the workpiece. These striations are formed in the direction perpendicular to the direction of media movement. Both the variations in the printing of the lines and of the grey scale may be quite small. However, the human eye is very sensitive to small changes in this type of pattern.

The visually perceptible changes in the parallel line, or grey scale, patterns primarily arise from three factors. First, there is a change in the absolute height of features being exposed and printed. This change in absolute height of the features is due to the change in velocity of the photosensitive media, and is directly proportional to such change. This change is the most tolerable to the human eye. If it were the only change occurring than both parallel black printed lines and the intervening white, or unprinted, lines would both be equally thicker or thinner with a respective slowing or speeding of the media velocity. Likewise, in a grey scale the typically square areas of black and white would each vary as respective identical black and white rectangles of heights that were either taller or shorter as the media velocity decreased or increased.

If the media velocity were to vary rapidly during the period of scanning just a few lines, or during the scanning of a single line, with the laser beam then these absolute height variations might be visually perceived as imperfections. Similarly, if the variations were to be significantly larger, then they may again be perceived as imperfections. But neither extremely rapid nor extremely large variations are normally the case. Furthermore, the human eye is typically sensitive only to the ratio between white and black areas for uniform fine patterns, and is not offended if horizontal lines, and grey-scale squares, are in some places a little "fatter" and in other places a little "thinner" so long as the ratio of black to white in these areas is constant throughout a large region, and preferably over the entire printed page. This means that a single page having thicker and thinner black horizontal lines will appear visually satisfactory (if the variation in media velocity and resultant feature height is neither too great nor too fast) so long as everywhere where the black lines are thick the intervening white lines are also thick, and everywhere the black lines are thin the white lines are also thin.

When an equal ratio of white to black is preserved everywhere in the image then the image will be perceived to be differentiated, but will also be perceived to be esthetically satisfactory. Unfortunately, the remaining two sources of visually perceptible changes in printed parallel lines, or grey scale, cause localized variations in the black to white ratio, and produce effects in the printed image, that are both readily perceived by the eye and appear as an esthetically undesirable variation in image uniformity.

The second source of visually perceptible change, and most important source of that visually perceptible change that is undesirable, in a printed image due to instantaneous velocity variations in the photoconductive media is resultant from the laser discharge (exposure) of the photoconductive media. The light intensity, and light energy, of the laser beam is essentially in a Gaussian distribution spatially around the spot where the laser light beam is focused. Meanwhile, the charged photoconductive media requires a certain amount of light energy for a certain time in order to discharge any point upon the photoconductive media to the state wherein it will print an opposite color to that which the color that a fully charged photoconductive media will print. In this selective discharge of a photoconductive media by a laser light beam there will be a threshold boundary region (relative to the focus point of the laser beam) that is dependent upon both the duration of exposure and upon the intensity level of the exposing light. This threshold boundary region discriminates between areas wherein the media has received insufficient light energy so as to remain charged, versus those areas wherein the media has received sufficient light energy during exposure to the laser beam so as to become discharged.

If the media slows down then the same amount of laser light will discharge more media area because the beam will dwell longer at each location on the media, and will expose a wider swath. In other words, if the laser beam intensity remains constant, then the effective spot size of the exposed area will increase for a slow media and will decrease for a fast media. This variation in the spot size is in both the horizontal and vertical directions. This causes a corresponding variation in the vertical size of printed features such as small horizontal lines and rectangles, and in the horizontal size of printed feature such as small verticle lines and rectangles. The precise appearance as to whether the features assume a localized appearance which is darker or lighter with diminished or increased media velocity is, of course, a function of whether the laser-exposed regions of the photoconductive media are printing white or black. However, the underlying nature of the change is the same in all instances, uniformly producing an undesirable variation in image uniformity.

A third source of visually perceptible, and undesirable, changes in a printed image due to variations in the instantaneous velocity of the photoconductive media is due to the exposure of images as a combination of scan lines. There is a lack of direct proportionality between the exposed image areas and the velocity of the photoconductive media because the exposed areas of the image are generally built up from a plurality of overlapping scan lines wherein the scanned laser beam was turned on. Since some of the change in velocity of the media results in a change in the percentage amount of overlap between successive scan lines—which overlap is not visible in the final image—then the change in the absolute height of the exposed image areas is not directly proportional to the change in media velocity. When the media is moving underneath the light, or laser, with a relatively faster speed then the exposed areas of the printed image will be of larger absolute heights, but these heights will actually be of a reduced ratio relative to those heights of the unexposed image areas, which heights are also increased. When the media is moving at a relatively slower speed then the exposed areas will be of smaller absolute heights, but these heights will actually be of an increased ratio relative to those heights of the unexposed image areas, which heights are also decreased.

An explanation of this third cause by which variations in the media velocity effect the ratio of the heights of exposed to unexposed image areas, and the equivalent ratio of the relative eights of white and black areas, is as follows. The monochrome image is created by the exposing laser beam. This laser beam so exposing a one color of the image is overlapped in its exposure of a one scan line to its exposure of the next scan line. Just one color, black or white, of the monochrome image is created by the exposing laser beam. Let this color be specified, by example and in way of illustration, to be white.

Normally an image, for example a horizontal white print line alternating with a horizontal black print line, is created by turning on the scanning laser beam for a certain number of scan lines and then, successively, leaving the scanning laser beam turned off for a certain number of scan lines. For equal width print lines, these certain numbers of scan lines upon which the laser beam is turned on and turned off are not identical. This is because there is overlap of one laser scan line to the next in the direction along the scan lines and perpendicular to the media movement. Because of this overlap a last scan line at which a laser is turned on within any white area (the white print line) will cause the white exposure of some of that height which is traced by the next scan line during which the laser is not turned on. Similarly, the last scan line at which the laser remains off at any black area (the black print line) will be partially exposed white by the next successive scan line when the laser beam is turned on.

This is simply an operation, by example, wherein white overwrites black. When successive scans of a scanning laser beam overlap, as is the actual case, then this overwrite operation immediately requires that fewer scan lines should be successively exposed, or written white, than will be next following scan lines left unexposed, or "written" black, in order to obtain equal height white and black print lines.

Moreover, this overwrite and overlap has a pronounced effect when the media varies in velocity. When the media slows then the overlap between scan lines is greater, reducing the height of the white exposed area. Also, and more importantly in visual effect, the white scan lines will overlap to a greater extent adjacent "black" scan lines, much reducing the ratio of black to white (as well as diminishing the absolute height of both features). It is this media-velocity-dependent alteration in the ratio of the heights between exposed white and black image areas which is especially detectable by, and disconcerting to, the human eye.

Drawings figures which aid in the visualization of the fairly complex second and third causes of nonuniformity in the printed image occurring with variations in the velocity of the photoconductive media will be discussed in conjunction with the description of the preferred embodiment of the present invention within this specification. For now, it is sufficient to understand that it is the maintenance of invariance in the ratio of exposed to unexposed, white to black, regions in the presence of media velocity variations that is dealt with by the present invention. If, for example, the ratio is 50%, meaning that half of the area is being printed with lines or grey scale dots or like images, then the present invention will act to preserve this 50% ratio even in the event of velocity variations in the photoconductive media. These velocity variations as would normally lead, by action of the second and third causes, to a nonuniformity in the ratio of the black and white areas within the exposed image.

After the three causes of variation in both the absolute, and the relative, heights of exposed, and printed, features dependent upon velocity of the media come to be understood, it might naturally seem (without much study or thought) that preferred solution in accordance with the present invention that will be taught within this specification is a sole, natural or only solution—especially since it works so well. This is not the case, and the solution in accordance with the present invention is actually quite exceptional in consideration of what the prior art might possibly suggest for the solution or amelioration of the image nonuniformity problem—should this problem even be recognized.

In the first place, it is not directly apparent from the prior art what could be done about this problem. Remember, the printed image nonuniformity problem particularly manifests itself as changes the ratio of dark-to-light areas in a grey scale, and as irregular heights and density of spaced parallel horizontal lines. The photoconductive media which is subject to undesirable exposure variations may be either a photoconductive drum, a photoconductive belt, or the like. These media may transfer the image to a final media such as paper or plastic film, or the final media itself may be photoconductive, such as a specially coated paper. Regardless of the processing transpiring after exposure, variations in the heights of features exposed which variations are due to instantaneous velocity variations in the photoconductive media necessarily result in undesirable, visually perceptible, variations in the printed image. Therefore, although not directly taught in the prior art, it might be reasonably hypothesized that something has got to be done to effect the areas that are exposed.

It might be firstly hypothesized that printed image variations should be attempted to be dealt with by an improved mechanical positional control of the photoconductive medium, possibly by use of an electromechanical feedback control loop. This is not the method adapted by the present invention.

It might be secondly hypothesized that variations in the uniform imaging of a photoconductive media should be dealt with by adjustment in the length of time during which such media is exposed, with a correspondingly correction to the exposed image areas. This very approach, or something similar, may indeed be considered to be that condition that fortuitously exists in non-impact electronic printers based on Light-Emitting Diode (LED) technology. In an LED printer system a linear array of LED's the width of the paper is used to write all the points, or pixels, on a given print line at one time. Instead of being based on a complex system including a single laser, a laser beam modulator, and assorted lenses and mechanical apparatus in order to sweep a laser beam positionally, the LED printer has a so-called "Light Stick" that exposes the photo conductive media surface with a single pass along its length. Each LED either lights or remains dark depending upon the bit mapped information received for that line of the image.

Of particular pertinence to the second hypothesized solution to the present problem, in the prior art LED "Light Stick" printer an encoder attached to the drive mechanism signals to the "Light Stick" print head exactly when to start exposing the media for each line. Since the LED's have a fast response time, approximately 5 micro seconds, this system provides a fairly good control of when to initiate exposure even when the media incurs velocity variations. It is, of course, necessary that the drive mechanism positional encoder should be accurate and timely to detect the precise media position regardless of velocity variations. It is further necessary that the media should not undergo significant velocity variations during movement over the smallest increment of distance, nominally one line, which is detected by the positional encoder. Both these requirements are normally satisfied.

It is not feasible to account for instantaneous variations of the photoconductive media in a laser printer employing a swept beam technology by controlling the onset time, and/or duration, of exposure. Control of the phase and the duration of exposure, which may be readily affected within an LED-array-type non-impact electronic printer, is not feasible in a swept beam laser printer. In a swept beam laser printer the laser beam is in motion under the influence of a mechanical system, and neither the onset time, or phase, of its arrival at any particular point on the image, nor its loiter, or duration, time at such point can be readily adjusted. Consequently, the present invention also rejects the approach that the phase at which exposure commences and/or the duration of such exposure should be adjusted in order to compensate for velocity variations in a photoconductive media being exposed.

Thus it seems that at least two hypotheses, each derived from consideration of the prior art, regarding how the image uniformity problem might be attempted to be solved do not, in actual fact, suggest good solutions. Remarkably, the solution in accordance with the present invention does not deal with either the mechanical movement of the media nor with the electrical phase or duration of the exposing light beam. Since many solutions, especially good ones, seem natural once they are clearly understood, it is interesting to note that the solution in accordance with the present invention is actually quite strange in consideration of anything that could be extrapolated from a direct frontal attack on the problem by a correction of the conditions of its origin, let alone by anything that could reasonably be suggested by an extension of the prior art.

SUMMARY OF THE INVENTION

The present invention is embodied in an apparatus, and method, for compensating for undesirable variations in the image areas exposed in a photosensitive and photoconductive media due to corresponding variations in the velocity of the media when it moves past a marking system, nominally a light or laser beam, which marks the media. More particularly, the present invention is concerned with compensating for undesirable variations in the balance, or ratio, between the sizes of white and the black image areas exposed within a photosensitive media due to variations in the velocity of the media.

In accordance with the present invention, the instantaneous velocity of a photosensitive media, moving within a system for marking such media with light, is sensed. The sensed instantaneous velocity is used to proportionately adjust the light intensity of the marking system, nominally a light or laser beam, which is exposing the photosensitive media. Particularly, the light intensity of a light, or laser, marking system is adjusted to be proportionately brighter, producing a proportionately wider scan line, when it is sensed that the instantaneous velocity of the photosensitive media is proportionately faster than an average velocity of this media. The light intensity is adjusted to be proportionately dimmer, producing a proportionately narrower scan line, when it is sensed that the velocity of the photosensitive media is proportionately slower than its average velocity.

A brighter laser light intensity results in (i) an exposed scan line of increased height (and, of lessor importance, width), (ii) a image print line (area) resultant from the overlapped combination of a succession of such scan lines which is also of increased height (and also width) and, importantly, (iii) a reduction in the height of vertically adjacent image print lines (areas) sufficient to make, in combination, that the height (and area) ratio of white to black lines (areas) remains constant. Equivalently, a dimmer laser light intensity results in (i) a decreased height of an exposed scan line, (ii) a resultantly exposed image print line which is also of decreased height, and (iii) the maintenance of a constant height (and area) ratio between white and black lines (areas).

By this compensation certain undesirable variations in the ratio of white to black image areas within the photosensitive media, which variations are due to variations in its velocity past the marking light or laser beam, will be corrected. Visually detectable imperfections in the exposed images, particularly in spaced parallel horizontal line and grey scale patterns, are substantially eliminated.

In one embodiment of the present invention, the instantaneous velocity of a photosensitive media is sensed by an optical encoder. The optical encoder detects encoding on a circular disk which is affixed to a drive shaft which moves the photosensitive media pass the marking system. The sensed velocity is processed in a Velocity Error Processor, or VEP, in order to produce a signal which controls the intensity of the marking system, nominally a laser. Within this VEP a running average velocity is determined, and the instantaneous sensed velocity is subtracted from this running average velocity in order to obtain the current instantaneous variation from average. The intensity of the marking system, nominally the light intensity of the laser, is modulated proportionately to this current instantaneous variation from average velocity. The VEP may further, optionally, incorporate a fail-safe circuit for suspending the adjusting, and for enabling the continuing operation of the printer, if the sensed velocity is not a- validly possible velocity. The VEP may be implemented from analog or digital electrical circuitry.

BRIEF DESCRIPTION OF THE DRAWINGS

These and other aspects of the present invention will become increasingly clear upon reference to the drawings and accompanying specification wherein:

FIG. 3 is a block diagram showing a second embodiment, digital, implementation of the VEP, part of the apparatus of the present invention.

FIG. 6, consisting of FIG. 6a through FIG. 6c, is a highly enlarged view of a portion of successive white and black print lines printed with the compensating method and apparatus in accordance with the present invention for each of the three cases of normal, slow, and fast media velocity.

DESCRIPTION OF THE PREFERRED EMBODIMENT

The present invention is directed to controlling the intensity of a light, or laser, beam within a system, nominally a non-impact printer, for marking a moving photosensitive, and photoconductive, media with the beam. The controlling of intensity is directed to compensating for variations in the image areas exposed within the photosensitive media due to variations in its velocity of movement past the laser beam whereat and whereby it is so exposed. These velocity variations, and attendant variations in the exposed, or printed image will, if not corrected or compensated, produce an image that shows undesirable deviations from uniformity. Particularly, closely-spaced parallel lines which are aligned perpendicular to the direction of media motion and/or grey scale (alternating minute exposed and unexposed areas) images will appear to visually exhibit undesirable striations and other nonuniformities.

The preferred embodiment of an apparatus in accordance with the present invention is particularly configured for use in a non-impact printer having a single laser beam. This laser beam is scanned transversely across a photoconductive media which is moved relative to this transverse scanning beam by a rotating drive shaft.

However, the application of the present invention is not so limited. A plurality of laser, or light, beams—up to and including the linear array of a multiplicity of LED's—can be controlled in intensity in accordance with the present invention. Likewise, it is not necessary that the media be driven by (nor that its velocity be encoded from) a rotating drive shaft. The media can, instead, be moved in a linear path such as by being carried upon a belt. It is well known to detect and encode linear velocity, including by linear optical encoders. Accordingly, when the particular preferred operational interface, particular preferred environment of use, and particular preferred embodiments of the present invention are next discussed, the fundamental principles of the present invention—for controlling intensity of a media-exposing light source responsively to velocity variations in the media being exposed—should be continuously considered in order that the scope of the present invention may be fully appreciated.

Figure 1:
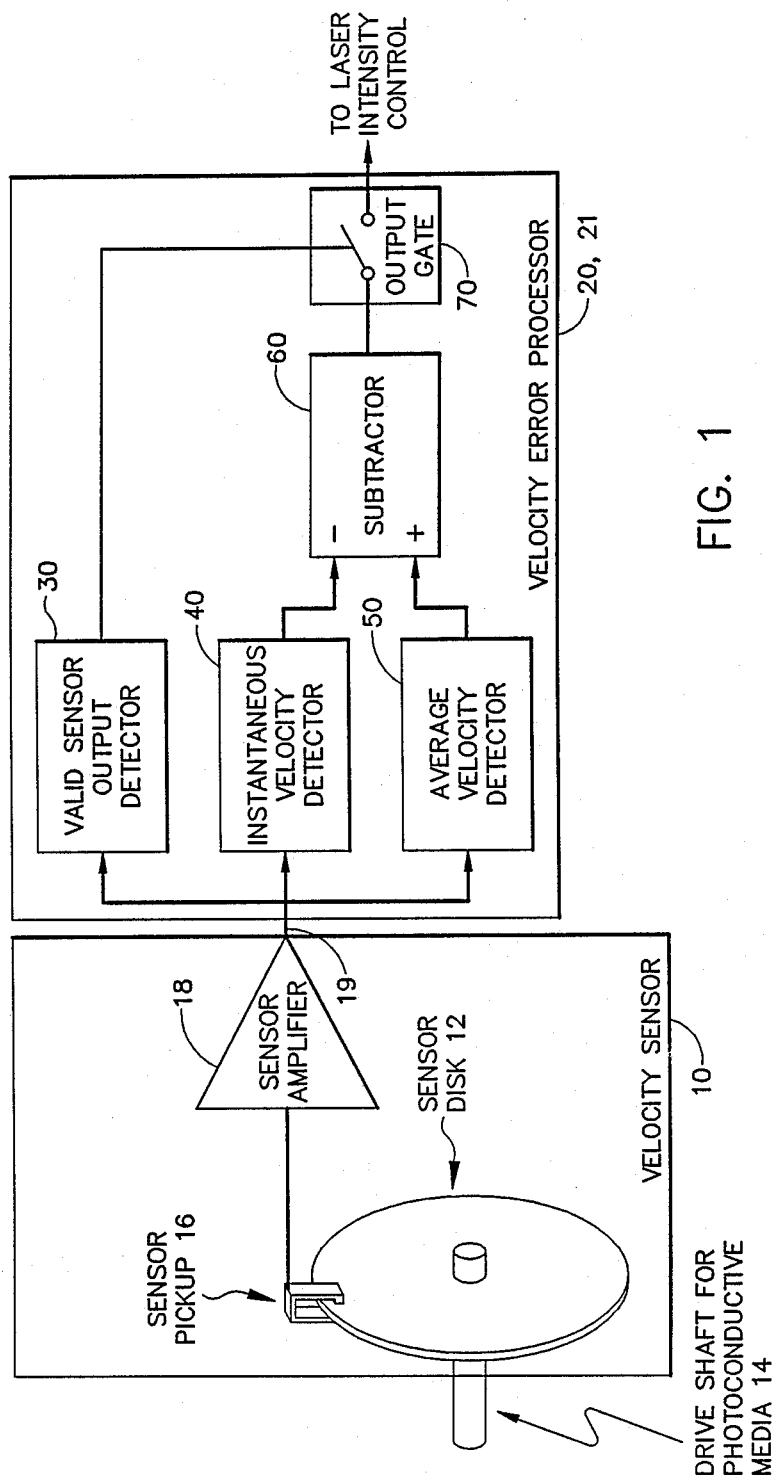
FIG. 1 is a block diagram showing the preferred embodiment apparatus of the present invention including a velocity sensor and a Velocity Error Processor (VEP).

The block diagram of a preferred embodiment media velocity sensor/laser intensity modulator apparatus in accordance with the present invention is shown in Figure 1. A velocity sensor includes a sensor disk 12 which is attached a drive shaft 14 which moves the photosensitive media (not shown) past a light source (not shown) whereat and by which it is exposed. The drive shaft for the photoconductive media 14 is preferably the final media drive shaft. This drive shaft is physically proximate, and closely linked, to the media and to its instantaneous velocity at the point and time of its exposure. For example, drive shaft 14 would be a shaft of a drum if the photoconductive media is on a drum.

Continuing with the velocity sensor 10 shown in FIG. 1, the sensor disk 12 can either be a clear optical disk exhibiting very fine radial rulings, or a magnetic disk (similar to a floppy disk for a computer) with closely spaced flux reversals written uniformly in around a circumferential track, or equivalent devices. The sensor pick up 16 can be either a light source and an accompanying optical sensor, or a magnetic sensor (similar to a floppy disk head or a tape recorder head), or equivalent sensors as befit the type of sensor disk 12 which is employed. Incremental optical rotary encoders are available from many manufacturers including Hewlett Packard, Dynamics Research Corporation, and the Instrument Division of Dresser Industries. A particularly high performance optical encoder, directed to positional encoding but also usable for the detection of angular velocity, is taught in copending U.S. patent application Ser. No. 07/043,167 for Optical Position Encoder to David J. Shelander and assigned to the same assignee as the present invention.

The signal from the sensor pickup 16 is optionally amplified in sensor amplifier 18 before being processed by the Velocity Error Processor (VEP) 20,21. The sensor amplifier 18 is often packaged integrally with the sensor pickup 16, and is readily realized from a operational amplifier.

Figure 2:
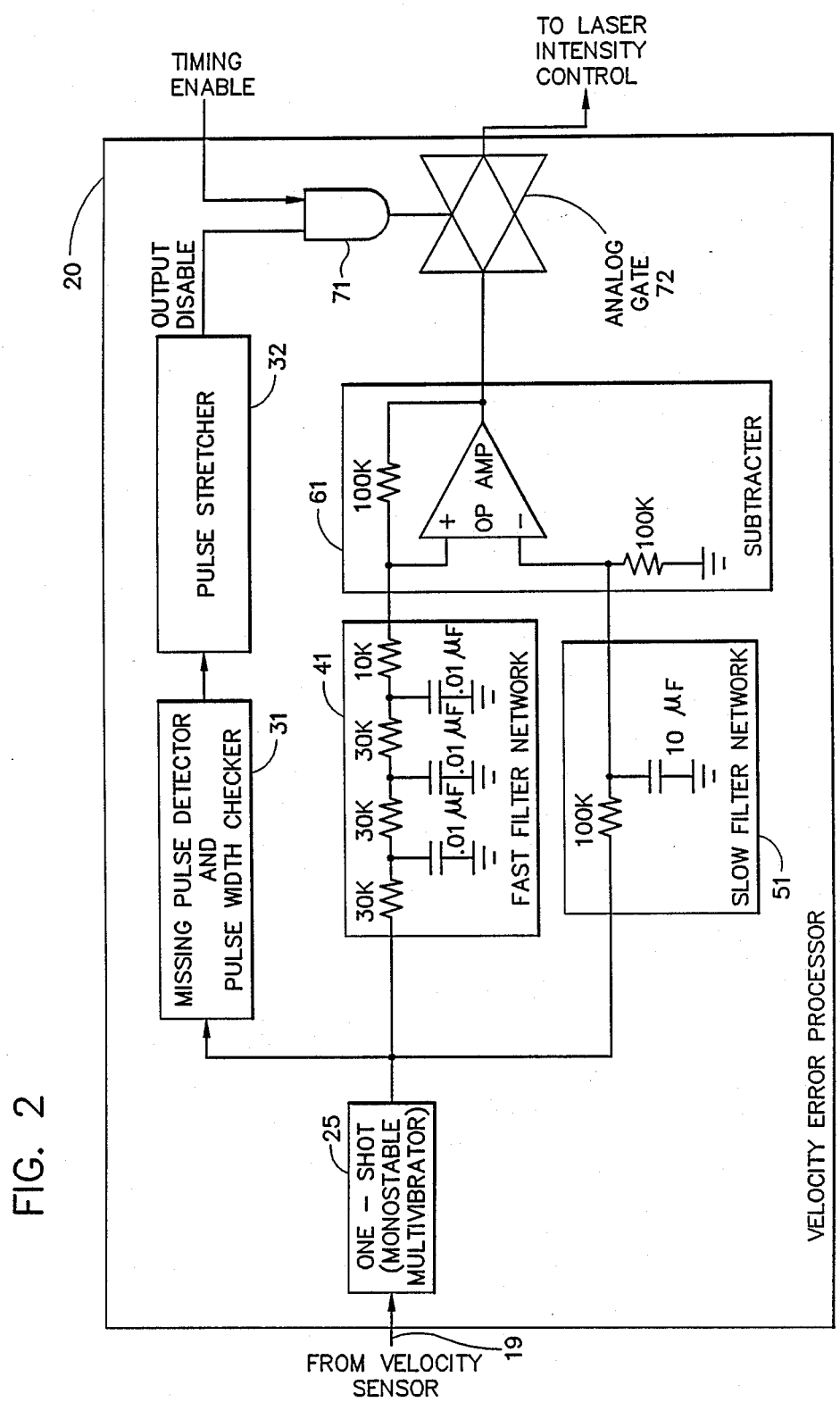
FIG. 2 is a block diagram showing a first embodiment, analog, implementation of the VEP, part of the apparatus of the present invention.

The signal developed by the velocity sensor 10 is indicative of the velocity of the media, substantially the instantaneous velocity since the sensor and its electronics respond exceedingly fast to minute changes in the velocity of the media as mechanically transported. This velocity signal 19 is communicated to Velocity Error Processor (VEP) 20,21. The VEP shown in block diagram in FIG. 1 bears the two identification numerals "20,21" because an analog embodiment VEP 20 will be shown in FIG. 2 while a digital embodiment 21 will be shown in FIG. 3, both embodiments having the same block diagram which is shown in FIG. 1.

The VEP 20,21 first determines in valid sensor output detector 30 if the sensor signal 19 is valid. If the sensor signal 19 is not valid, then the output of the VEP is disabled by the output gate 70. This provides a "fail-soft" mode of operation of the VEP 20,21 that allows the laser modulator and printer (not shown) which interface to the VEP 20,21 to operate normally, without any intensity compensation, in case of a failure in the velocity sensor 10. Both the average velocity and instantaneous velocities are respectively determined by the average velocity detector 50 and the instantaneous velocity detector 40. It is not necessary that the average velocity—which is preferably a running average velocity and is more preferably a weighted running average velocity with the historical sensed velocities more heavily weighted in accordance with their proximity to the present time—should be detected or developed. A predetermined constant average velocity will suffice for operation of the VEP 20,21. However, an average velocity detection, or determination, allows that long term variations in the drive velocity of the media may be accommodated, and that the VEP 20,21 will "renormalize" at a new long term average media velocity. This might be useful if, for example, there were two or more different speeds of media transport which were associated with differing media, differing intended average exposures of the same media (contrast or light/dark scale variation), or the like.

Continuing in the block diagram of the VEP 20,21 shown in FIG. 1, the difference between that signal representative of instantaneous velocity which is developed in instantaneous velocity detector 40, and that signal representative of average velocity which is developed in average velocity detector 50, is the instantaneous velocity error signal. This instantaneous velocity error signal is developed in subtracter 60. If, by action of the valid sensor output detector 30, this instantaneous velocity error signal is enabled to pass through output gate 70, then it will be communicated as a input, control, signal to the light, or laser, intensity control circuitry. The effects of any absolute velocity or sensor errors, and the requirements for careful factory and field calibration, are eliminated by the preferred embodiment implementation of the VEP 20,21 wherein the instantaneous velocity error signal is constantly calculated as a deviation from (running) average media velocity, and not merely as a deviation from some predetermined and fixed velocity.

The preferred embodiment VEP 20,21 in accordance with the present invention is capable of being implemented in both analog electronics and digital electronics. An analog embodiment of the VEP 20 is shown in block diagram form in FIG. 2. A one-shot, or monostable, multivibrator 25 produces a fixed width pulse responsively to the sensor signal 19 received from the velocity sensor 10 (shown in FIG. 1). The frequency of the pulses produced by the one-shot 25 varies with the rotational velocity of the media drive shaft and the sensor disk 12 (shown in FIG. 1). Therefore, the average dc value of the output signal of the one-shot 25 is proportional to the rotational velocity of the sensor disk 12.

Two RC filter networks are connected to the one-shot output: one fast filter network 41 with a relatively fast time constant and one slow filter network 51 with a relatively slow time constant. The signal output of the fast filter network 41 represents the instantaneous velocity of the media, and the signal output of the slow filter network 51 represents the average velocity of the media. The difference between these two signals is determined by an analog subtracter 61 which is made from an operational amplifier and several resistors. The output of the analog subtracter 61 is gated by an analog gate 72. The analog gate 72 is controlled by a logic ANDing in AND gate 71 of a timing enable from the laser control circuitry and of a signal output of pulse stretcher (one-shot) 32. The pulse stretcher 32 is driven by a missing pulse detector and pulse width checker 31, both of which use one-shot multivibrators. These one-shots will disable the output gate 72 of the VEP 20 for a fixed period of time if the input pulses developed in one-shot 25 are out of a predetermined specification.

A digital embodiment of a Velocity Error Processor (VEP) 21 in accordance with the present invention is shown in block diagram in FIG. 3. The digital implementation of VEP 21 is more complex than the analog implementation of VEP 20 shown in FIG. 2, but provides significantly more flexibility in both the correction algorithms and in criteria for disabling the output gate of the VEP 21. In the digital embodiment of VEP 21, a microprocessor 80 executes a microcoded program which is stored in program memory, or PROM, 83. The microprocessor 80 is interrupted every time there is an output from the velocity sensor 10 (shown in FIG. 1). At the time of the interrupt, the microprocessor 80 reads the contents of the counter 81, and then clears this counter 81. The counter 81 is continuously and independently increments by the microprocessor oscillator. The value read from the counter 81 by the microprocessor 80 at the time of the interrupt is proportional to the time between interrupts (i.e., the time between pulses from the velocity sensor 10).

The average velocity is calculated by the microprocessor 80 and stored in the RAM 82. From this average velocity data (processed and stored from successive readings of counter 81), and from the current velocity which is determined by the current reading of counter 81, the microprocessor 80 calculates the value of the light, or laser, intensity correction. It should be noted that the value read from counter 81 is inversely proportional to the photoconductive media velocity. The microprocessor 80 transfers the calculated intensity correction value to a digital to analog converter (DAC) 84. The DAC 84 provides an analog output voltage signal which is gated to the laser intensity control by the analog gate 73.

The enable input signal for the analog gate 83 is developed by a logic ANDing within AND gate 74. This ANDing is of the timing enable from the laser control circuitry and an enable from the microprocessor routed via control latch 85. The microprocessor 80 keeps track of the number of valid and invalid inputs (interrupts) from the velocity sensor 10 (shown in FIG. 1) and will disable the analog gate 73 if it cannot provide an accurate intensity correction signal to the light, or laser.

The explanation as to why the apparatus, and method, in accordance with the present invention successfully operates to ensure print image uniformity is the subject of the remainder of this specification. For the purposes of this explanation it will be arbitrarily chosen that the area exposed by the laser beam prints white. This is routinely accomplished in laser printers wherein the laser beam discharges certain regions of a photoconductive media. The toner will adhere to the areas not discharged by the laser. A white image is thereby caused to be printed in areas exposed by the laser beam while a black image is caused to be printed in all other areas. It should be understood that some laser printers function oppositely. In these laser printers the photosensitive media and toner are charged in such a way that the toner will adhere to the areas exposed by the laser beam, thereby printing black in these areas. The apparatus and method of the present invention is equally applicable to both positive and negative imaging, and the following explanation is directed to the one type of laser printer that prints white in the laser-exposed areas only by example, and in simplification of the explanation.

Figure 4A:
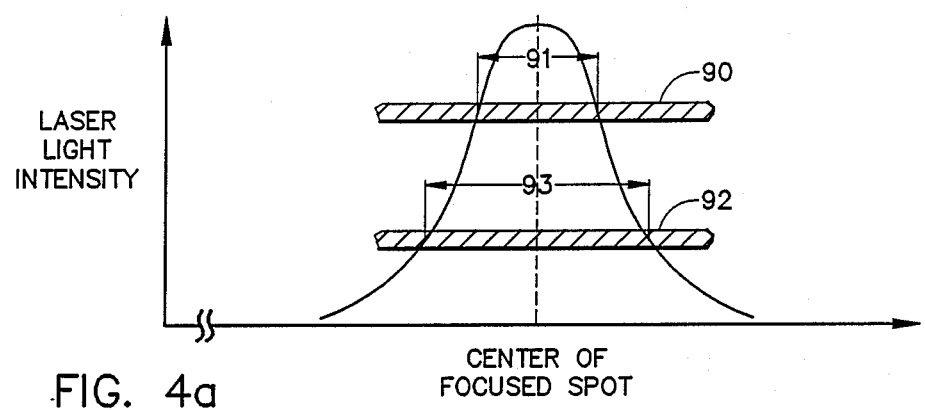
FIG. 4, consisting of FIG. 4a through FIG. 4c, is a series of graphs showing effective spot size of an exposing laser beam at different velocities of the photoconductive media.
Figure 4B:
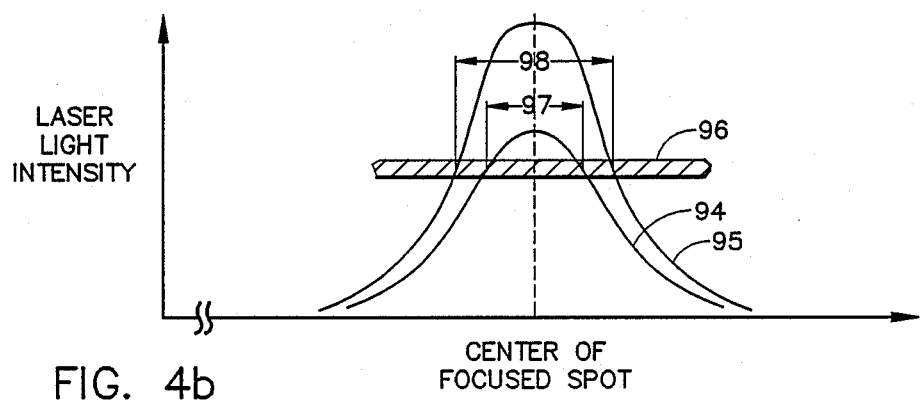
Figure 4C:
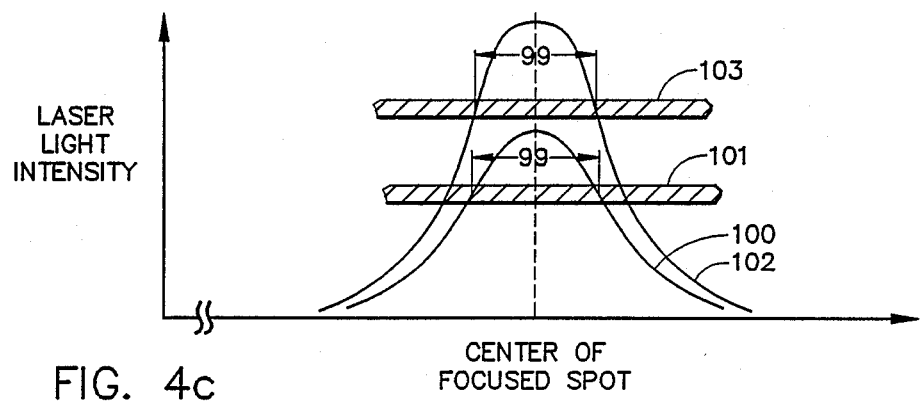

The energy distribution (in a one arbitrary dimension) about the point where the laser is focused is shown in each of FIGS. 4a–4c. The energy distribution is more or less a Gaussian curve such as appears in each Figure. Light intensity in the vertical axis is plotted relative to displacement in any direction in the plane of the photoconductive media from that one point, or center spot, whereat the laser is (momentarily) focused in the plane of the media.

A charged photoconductive media requires an impingement of a certain amount of light for a certain amount of time in order to discharge it to the state where it will print an opposite color (by example, white) to that color (by example, black) that would otherwise be printed by a fully charged media. There is a threshold region, dependent on both the time of exposure and the level of exposure, that separates whether the media will be charged or discharged after exposure.

The striped band 90 shown in FIG. 4a is such a threshold region for a fast-moving media, and the corresponding effective exposed spot size is given by dimension 91. In regions of the Gaussian curve above the band 90 the fast-moving media is fully discharged by the laser beam, and in regions of the Gaussian curve below the band 90 the fast-moving media remains charged. Within the band 90 itself there is uncertainty as to whether or not the media will be sufficiently discharged so as to print white, or will remain charged and print black. (However, despite the uncertainty, one condition of the other will hold sway and grey will not be printed.) Similarly, the striped band 92 shown in FIG. 4a is an alternative threshold region for a slow-moving media, and the corresponding effective exposed spot size is given by dimension 93. In regions of the Gaussian curve above the band 92 the slow-moving media is fully discharged by the laser beam, and in regions of the Gaussian curve below the band 92 the slow-moving media remains charged. Within the band 92 itself there is uncertainty as to whether or not the media will be sufficiently discharged so as to print white, or will remain charged and print black. Obviously the effective exposed spot size is larger for a slow-moving media (dimension 93) than for a fast-moving media (dimension 91).

If the media slows down, then less light will be required to discharge the media because the beam dwells longer at each location on the media. If the laser intensity remains constant, the effective spot size will increase as shown in FIG. 4a for a slow-moving media and will shrink for a fast-moving media. This variation in the laser spot size affects both horizontal and vertical size of printed features. This effect may be corrected by changing the laser intensity as the velocity of the photoconductive media (the drum speed) changes. This is illustrated in FIG. 4b wherein Gaussian curve 94 represents a laser beam of relatively lower intensity or power while Gaussian curve 95 represents the same laser beam at higher intensity, or power. At a same, constant, media velocity the striped band 96, locating the threshold region above which the media will be discharged and below which the media will remain charged, defines an effective exposed spot size of relatively smaller dimension 97 on the relatively lower laser intensity curve 94, and of relatively larger dimension 98 on the relatively higher laser intensity curve 95.

Applying the teaching of FIG. 4b to the practical intensity control necessary to counteract the variation in effective exposure spot size (only, and it should be remembered that other effects are operating) with media velocity changes is shown in FIG. 4c. The threshold region between media discharge and charge retention for a slow-moving media is shown by striped band 101. At this rate of media movement the intensity of the exposing laser beam is controlled to be as represented by Gaussian curve 100, causing that the effective exposed spot size is of dimension 99. The threshold region between media discharge and charge retention for a fast-moving media is shown by striped band 103. It is displaced higher in laser light intensity from band 101 because the media will not spend so long a time under the exposing laser light. At this rate of media movement the intensity of the exposing laser beam is controlled to be as represented by Gaussian curve 102, causing that the effective exposed spot size is again of dimension 99. By this manner of variation in the intensity of the exposing laser light beam the undesirable variations in image uniformity that are due (solely) to variations in effective exposure spot size with media velocity changes are corrected for, and eliminated.

The variations in image uniformity due to exposure spot size are not, however, the sole source of such variations. Variations in print image uniformity also arise because of overlapping between successive scan lines during image generation. A diagrammatic, conceptualized, representation of the results on this problem from operation of the media velocity sensor/laser intensity modulator apparatus in accordance with the present invention is shown in FIGS. 5 and 6, each consisting of parts a through c. The representation within each of FIGS. 5 and 6 is of a greatly magnified small area of alternating white and black print lines. A white print line consists of several, for example three (3), successive partially overlapping scan lines within which the light, or laser, beam is turned on, thereby exposing the photosensitive media. A black print line consists of several, for example 5, successive partially overlapping scan lines within which the light, or laser, beam is not turned on, thereby leaving the photosensitive media unexposed. The appearance of such, printing respectively without and with benefit of the compensation enabled by operation of the apparatus and method of the present invention is conceptually illustrated, with exaggeration for the sake of clarity, in respective FIGS. 5 and 6.

Figure 5C:
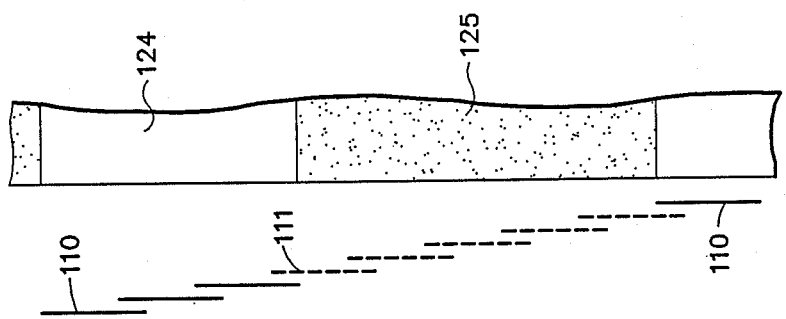
FIG. 5, consisting of FIG. 5a through FIG. 5c, is a highly enlarged view of a portion of successive white and black print lines printed without the compensating method and apparatus in accordance with the present invention for each of the three cases of normal, slow, and fast media velocity.
Figure 5B:
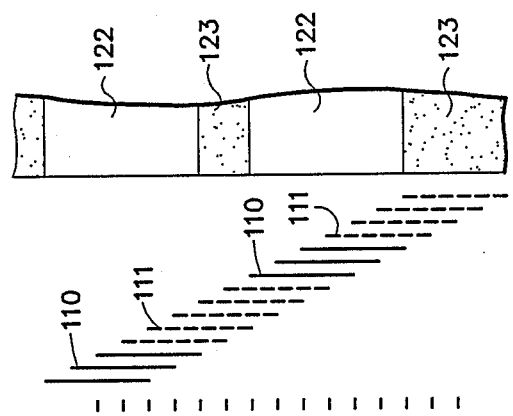
Figure 5A:
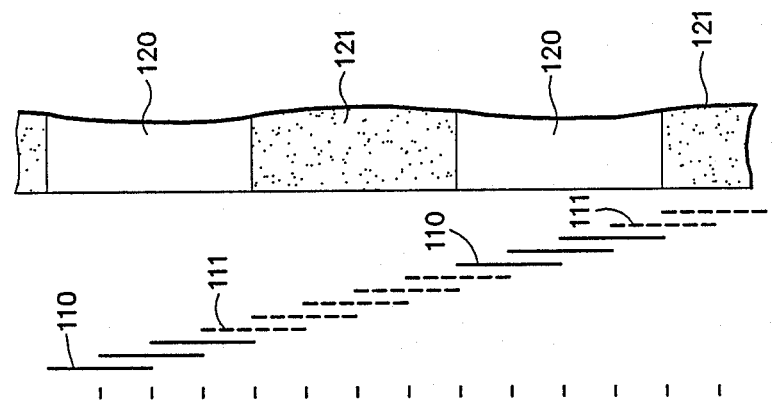

Within both FIG. 5 and FIG. 6 the printing, accomplished by exposure of a photosensitive media, proceeds from top to bottom with a movement of the media being in the opposite direction. If the printing is done by a scanning beam, then the transverse motion of this beam may additionally cause that the printing is also being performed right-to-left, or left-to-right, or bidirectionally. This motion, if any, is of no consequence to the operation of the present invention. In order that the effects of the present invention may be best observed, it is illustrated that the media does not move with a steady velocity. The amount of media movement is indicated by vertically arrayed "tick marks" 100,101,102 (which have no actual real, physical, basis but which are merely indications on a scale) respectively to the left of FIGS. 5a and 6a, 5b and 6b, and 5c and 6c. In each of FIGS. 5a and 6a the media moves at its nominal, average, velocity which corresponds to "tick marks" 100 denoting this movement which are at an arbitrary separation which will be defined as two (arbitrary) units of distance. In each of FIGS. 5b and 6b the media moves with a reduced velocity, indicated by "tick marks" 101 to be one distance unit per (arbitrary) time interval. Finally, in FIG. 5c and 6c the media moves with an increased velocity, illustrated by the separation of "tick marks" 102 to be three distance units per time interval. In actual operation of a printer, such extreme, 50%, velocity variations would not be anticipated. However, FIGS. 5 and 6 are exaggerated in order to more clearly show the operation of the present invention.

Centered about each "tick mark" 100,101,102 in FIGS. 5 and 6 is an indicated vertical height which constitutes one scan line. This height of a scan line is illustrated by a solid vertical line, for example lines 110 shown in FIG. 5, when the laser is turned on, exposing the photosensitive media and writing what is nominally the white image. The scan lines, and scan line heights, are illustrated by dashed vertical lines for all "tick mark" positions wherein the laser is turned off, not exposing the photosensitive media and "writing" a black image. These dashed-line laser-off scan lines, for example scan lines 111 shown in FIG. 5, are of equal vertical extent to the solid-line laser-on scan lines, for example scan lines 110 shown in FIG. 5. The scan lines are not actually horizontally displaced one to the next, it being understood that FIGS. 5 and 6 are diagrammatic only.

There is an overlap between scan lines. In identical FIGS. 5a and 6a this overlap is illustrated to be 50%, or one distance unit, when the media is moving at nominal average velocity, or two distance units between successive tick marks. At this media velocity (two units) and degree of overlap between successive scan lines (50%, or one unit) then three laser-on scan lines 110 followed by five laseroff scan lines 111 will produce that identical height (eight units) between exposed, white, print line 120 and unexposed, black, print line 121 which is illustrated in FIGS. 5a and 6a. Note that the number of scan lines during which the laser is turned on (three) is not equal to the number of scan lines within which the laser is turned off (five) because the media only needs to be exposed but once, meaning that white overwrites black in image formation.

The operation of a laser printer, scanning or not so long as the height of scan-equivalent lines is maintained constant, when the photosensitive media slows by 50%, to one unit per "tick mark" is shown in FIG. 5b. The height of the white print line 122 is diminished to six units, but the height of the black print line 123 is even more severely diminished to two units. The ratio of white to black print line heights has changed from 1:1 to 3:1. It is this change, more than the absolute change in heights, which is acutely discernible by the human eye. The printed area has become much lighter overall.

The equivalent operation of the laser printer operating without benefit of the present invention when the media velocity increases 50% from average, to three units per "tick mark" is shown in FIG. 5c. The height of the printed white line 124 increases 25% to ten units but the height of the black print line 125 increases 50% to twelve units. The ratio of white to black pint line heights changes from 1:1 to 5:6. Although not as severe as the change resultant from a slowing of the print media velocity, this change is still undesirable and potentially shows to the human eye as an overall darkening of the printed area.

The effect of operating a scanning light printer in accordance with the apparatus and method of the present invention is shown in FIGS. 6b and 6c. It is illustrated in FIG. 6b that the media velocity slows 50% to one unit per "tick mark", identically as in FIG. 5. However, by operation of the present invention, the intensity of the laser beam exposing the photosensitive (discharging the photoconductive) media is proportionately reduced by 50%. It is a characteristic of light discharge of a photoconductive media (light exposure of a photosensitive media) that the height of the strip, band, or scan line discharge will be approximately proportional to the intensity of the discharging light beam. Consequently, the laser-on scan lines 112 shown in FIG. 6b are illustrated to be reduce 50% in height, from four units to two units. The laser-off scan lines 113 are illustrated to be correspondingly reduced, but this is only arbitrary for the sake of symmetry of illustration. The laser-off scan lines can be envisioned to remain at four units height, if desired: since white overwrites black it makes no difference. The effect of the intensity compensation in accordance with the present invention may be observed in FIG. 6b to produce a white print line 126 and a black print line 127 of equal height of four units. The ratio of white to black image area has not changed from the original 1:1 and the eye is satisfied. This is true even though both the white and the black lines have become 50% thinner.

Finally, the effect of the intensity compensation in accordance with the present invention upon a 50% slowing of the velocity of the photosensitive media may be observed in FIG. 6c. Therein a laser-on scan line 114 of 50% greater height, or six units, and a laser-off scan line 115 may be observed to produce a white print line 126 and a black print line 127 which are of equal twelve unit height. The ratio of white to black image area has not changed from the original 1:1 and the eye is satisfied. This is true even though both the white and the black lines have now become 50% thicker.

The operation of the present invention is equivalent in the printing of grey scale. An actual laser printer might be capable of printing 1200 dots, or pixels, per inch in the horizontal direction and 2400 in the vertical direction. A very fine grey scale, not resolvable (or barely resolvable) with the naked eye, which is printed with such a printer might consist of alternating squares of 5 dots, or pixels, in the horizontal direction by 10 dots, or pixels, in the vertical direction, or squares of 1/120 inches on a side. Those real and actual, visually perceptible, imperfections which occur in the printing of an actual grey scale due to variations in the velocity, and resultant exposure, of a photosensitive media cannot exactly be extrapolated from the much magnified, and much exaggerated, appearance of FIGS. 5 and 6. However, FIGS. 5b and 5c do hint in their nonuniformity that something might be imperfect in the printing of a grey scale image in a scanning laser printer not incorporating the present invention. This is indeed the case, with the actual, normal scale, gray scale image essentially showing horizontal (row-oriented) black/white intensity variations, or striations. Similar to the compensatory effect illustrated in FIG. 6 for the printing of closely space horizontal lines, the present invention also significantly ameliorates prior problems experienced with the printing of grey scale.

In accordance with the preceding discussion, the present invention will be recognized to have diverse aspects, and embodiments, directed to compensating for media-velocity-variation-induced variations in the image formed on a moving photosensitive media by dynamically adjusting the intensity of the exposing light, or laser, beam. Correspondingly, the present invention should be defined by the scope of the following claims, only, and not solely in consideration of those embodiments within which the invention has been taught.

We claim:

1. A method of compensating for the instantaneous velocity variations of a photosensitive media past a marking system comprising:
   sensing the velocity of a photosensitive media past a system for marking such media with light; and
   adjusting the light intensity of the system for marking proportionately to the velocity sensed.

2. The method according to claim 1 wherein the sensing of velocity is derived from detection of encoding upon a surface circumferentially affixed around a drive shaft which serves to move the photosensitive media past the marking system.

3. The method according to claim 2 wherein the detection of encoding is optical detecting of optical encoding.

4. The method according to claim 2 wherein the detection of encoding is magnetic detecting of magnetic encoding.

5. The method according to claim 1 wherein the adjusting further comprises:
   determining an average velocity from the velocity sensed;
   subtracting the determined average velocity from the sensed velocity to obtain the variation from average velocity; and
   modulating the light intensity about a base light output to be proportionately brighter with an increasing variation from average velocity in a one sense and to be proportionately dimmer with an increasing variation from average velocity in the opposite sense.

6. The method according to claim 1 further comprising:
   determining whether the sensing of velocity is of a validly possible velocity; and
   disabling in a fail-safe manner the adjusting if the sensed velocity is not a validly possible velocity.

7. An apparatus for compensating the image exposed on a photosensitive media moving with a varying velocity past a location whereat the media is exposed, the exposure compensating apparatus comprising:
   a sensor for sensing the velocity of the photosensitive media past the location whereat it is exposed;
   a light source which is controllable in intensity for exposing the photosensitive media;
   an exposure intensity control circuit responsive to the sensed velocity for controlling the intensity of the light source to be relatively brighter when the sensed velocity is relatively faster and to be relatively dimmer when the sensed velocity is relatively slower;

wherein variations in the image formed on the photosensitive media due to its varying velocity past the location whereat it is marked may be compensated.

8. The image compensating apparatus according to claim 7 wherein the sensor further comprises:
an optical encoder of velocity.

9. The image compensating apparatus according to claim 7 wherein the light source comprises:
a laser.

10. The image compensating apparatus according to claim 7 wherein the exposure intensity control circuit comprises:
a first storage circuit for storing the currently sensed velocity of the media;
a second storage circuit for storing an average velocity of the media;
a subtracter communicating with the first and second storage circuits for deriving the difference between the average velocity and the currently sensed velocity;
wherein the control of the light source is proportional to the subtracter-derived difference.

11. The image compensating apparatus according to claim 10 wherein the second storage circuit further comprises:
an averaging circuit for formulating a running average velocity of the media for storing as said average velocity.

12. In a light printer apparatus having a drive means for moving photosensitive media in a first direction and having light scanning means for scanning a light beam in a second direction, perpendicular to the first direction, in order to cause, by selectively enabling the scanned light beam to impinge upon the photosensitive media, the printing of information upon the media, an apparatus improvement according a more uniform printing of the photosensitive media in the presence of variations in a velocity of movement of the media in the first direction, the light printer apparatus improvement comprising:
a sensor producing a signal proportional to the velocity of movement of the photosensitive media in the first direction; and
a velocity error processor, responsive to the signal, for producing a correction to the intensity of the scanned light beam so that, when and where the light beam is selectively enabled to impinge upon the photosensitive media, the ratio of exposed to unexposed image areas of the photosensitive media is more nearly uniform for any particular given information being printed despite variations in the velocity of movement in the first direction.

13. In a light printer moving a photoconductive media in a first direction while also scanning a light beam in a second direction, perpendicular to the first direction, across the photoconductive media, a method of minimizing variations in exposure of the media due to variations of movement in the first direction, the method comprising:
sensing the velocity of the photoconductive media in the first direction; and
adjusting the intensity of the light beam scanning in the second direction proportionately to the velocity sensed in order to make a more uniform exposure of successively swept areas of the photoconductive media.

14. A method of compensating the light imaging of a photosensitive media which moves with a varying velocity past a location whereat the media is exposed by light, the method comprising:
determining the current velocity of the photosensitive media past the location whereat it is imaged; and
varying the intensity of light which is imaging the media proportionately to the current velocity of the media.

15. The imaging compensating method according to claim 14 further comprising:
calculating a running average velocity from a succession of determined current velocities; and wherein the varying is proportionately to the current velocity and to the running average velocity.

16. The imaging compensating method according to claim 14 wherein the determining and the varying area each at least partially analog in analog electrical circuitry.

17. The imaging compensating method according to claim 14 wherein the determining and the varying are each at least partially digital in digital electronic circuitry.

* * * * *